Figure 1:
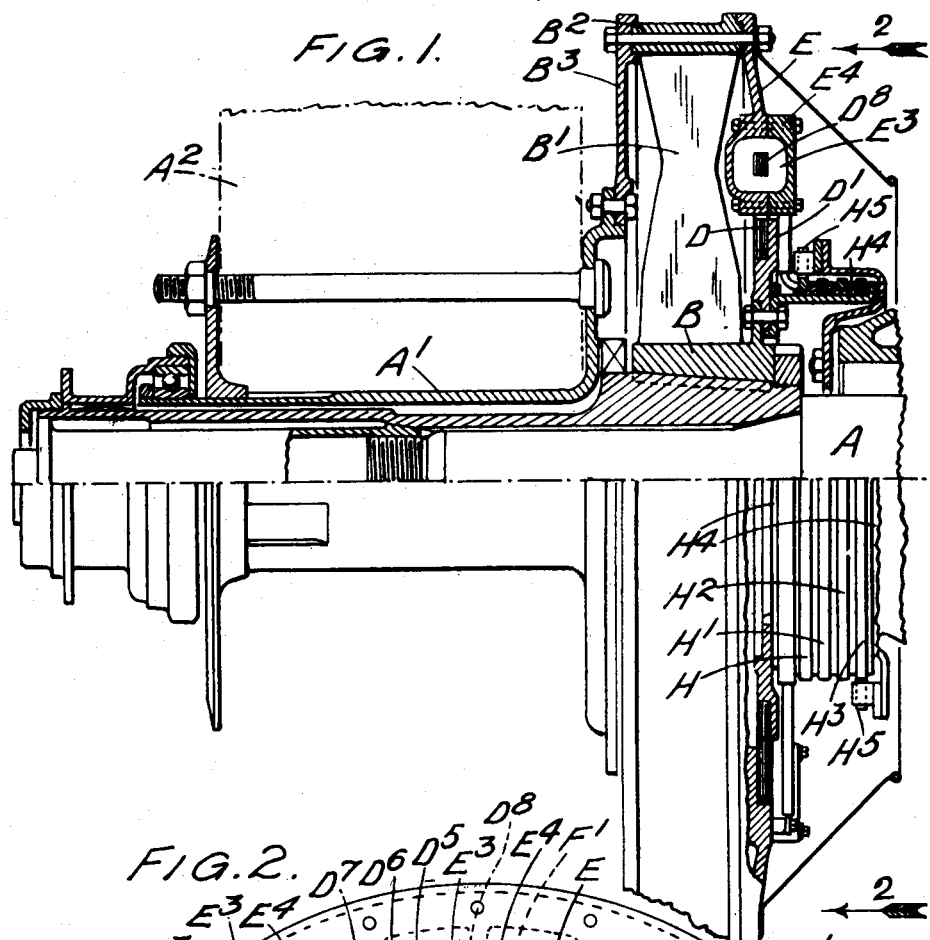

Sept. 12, 1939.  N. S. MUIR  2,173,039

TRANSMISSION DYNAMOMETER

Filed Feb. 15, 1937  5 Sheets-Sheet 1

Inventor,
N. S. Muir

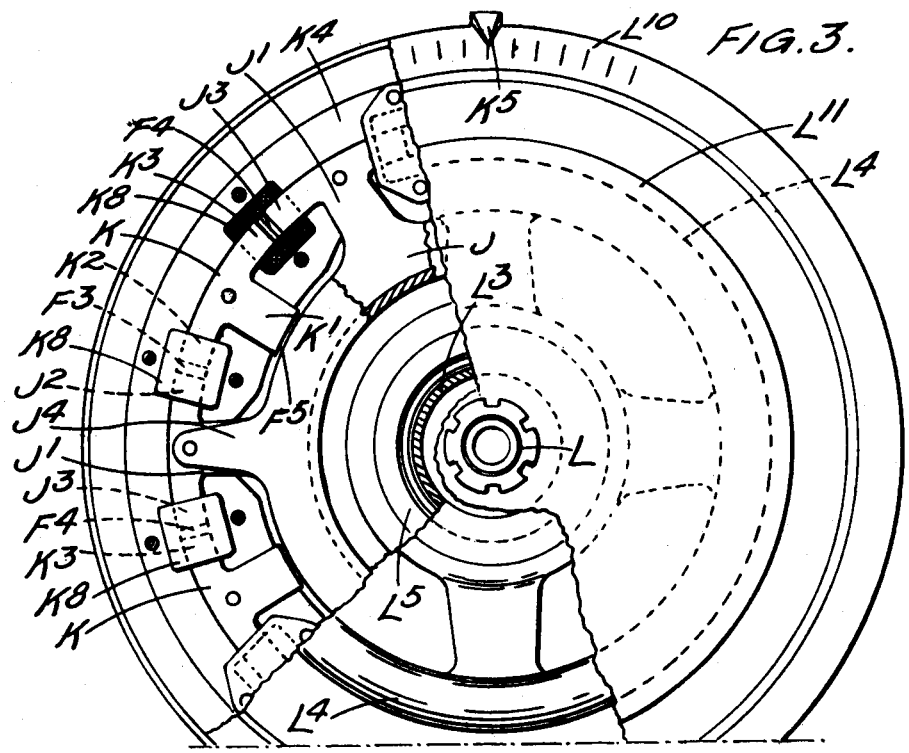

Inventor,
N. S. Muir

Sept. 12, 1939.  N. S. MUIR  2,173,039
TRANSMISSION DYNAMOMETER
Filed Feb. 15, 1937  5 Sheets-Sheet 4

Inventor,
N. S. Muir

Sept. 12, 1939.   N. S. MUIR   2,173,039
TRANSMISSION DYNAMOMETER
Filed Feb. 15, 1937   5 Sheets-Sheet 5
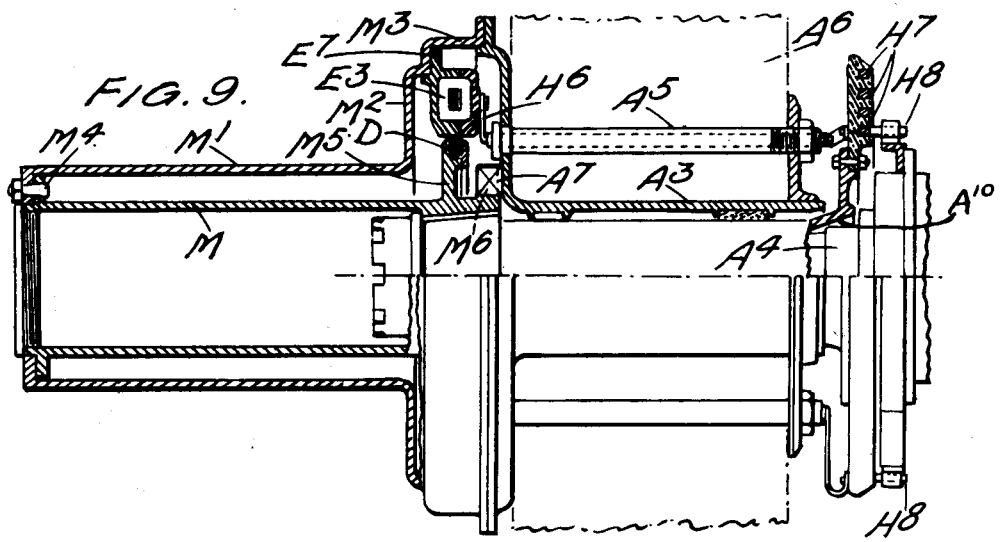
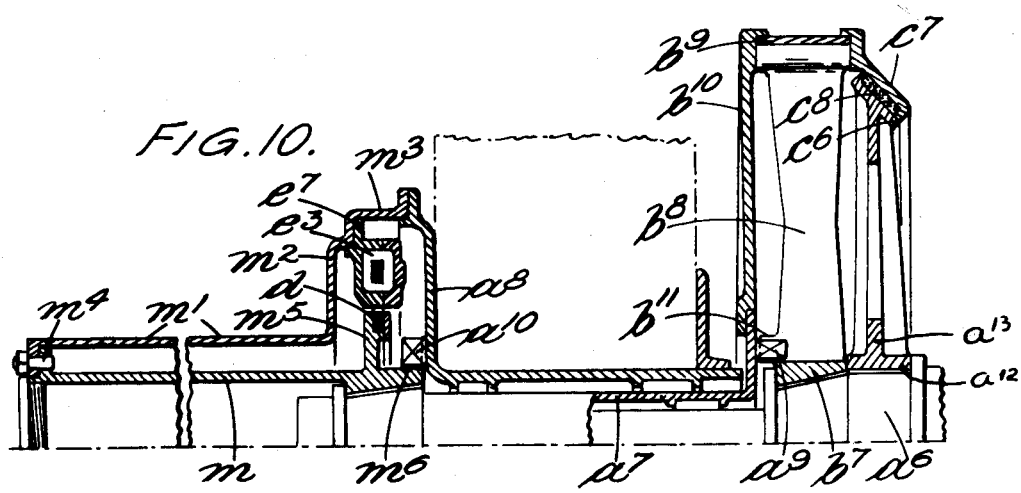
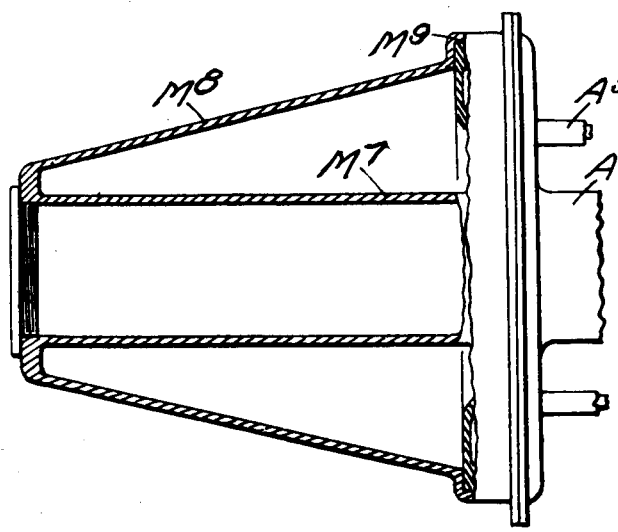
Inventor,
N. S. Muir Patented Sept. 12, 1939

2,173,039

UNITED STATES PATENT OFFICE 2,173,039

TRANSMISSION DYNAMOMETER

Neil Shaw Muir, Guildford, England

Application February 15, 1937, Serial No. 125,914
In Great Britain February 21, 1936

12 Claims. (Cl. 265—25)

This invention relates to transmission dynamometers for measuring the force or torque in a power transmission system.

One object of the invention is to provide a transmission dynamometer capable of measuring the true mean value of force or torque transmitted irrespective of transient variations or oscillations of such force or torque.

Another object of the invention is to provide a dynamometer comprising two springs or the equivalent forming part of a power transmission system and connected in series with one another between the driving and driven members of the system, a device for damping oscillations of one of the springs, and means for measuring the deflection of the other spring.

It is to be understood that by the term "spring" is meant any member which is caused to deflect or otherwise vary its shape or size in accordance with the force exerted thereon due to the power transmitted by the system of which such member forms a part. Thus for example in a torsion dynamometer the spring may consist of part of a transmission shaft, a quill shaft, a radial-spoke type spring comprising a number of springy arms radiating from a central hub or boss to an annular rim or the equivalent, or any convenient combination of these.

In one convenient form of torsion dynamometer a radial-spoke type spring is provided for connecting the driving member to an annular rim or other intermediate member, and another spring, preferably of the radial-spoke or quill shaft type, for connecting the rim to the driven member, a damping device being connected across one spring and deflection measuring apparatus across the other spring. Preferably the damping device is connected between the driving member and the rim whilst the measuring apparatus is connected across the other spring. Conveniently the damping device consists of two concentric rings respectively connected to the rim and the driving member and having cooperating frusto-conical surfaces so arranged that they are in frictional engagement with or without an intervening layer of friction material.

In a torsion dynamometer particularly suitable for measurements on the airscrews of aircraft, two radial-spoke type springs are used and the spokes of the two springs are interleaved, the outer ends of the spokes of the damped spring engaging in rotatable trunnions in the rim or being otherwise attached thereto in such a manner as to permit relative movement between the ends of the spokes and the rim when the spokes deflect. The spokes of the other spring are rigidly connected to the rim and to the driven member so as to avoid any backlash which would adversely affect the readings obtained by the deflection measuring apparatus.

A further object of the invention is to provide electromagnetic apparatus for measuring small relative movements between two elements which constitute part of a spring and are caused to move relatively to one another by the applied force. The relative movement which it is desired to measure may be an angular movement or a translational movement, but it is usually only one component of the various possible relative movements which can take place between the two elements, and for convenience will hereinafter be referred to as the selected component of movement.

This feature of the invention is concerned with electromagnetic measuring apparatus of the kind in which the selected component of movement is caused to vary the reluctance of a magnetic circuit, as by varying the length of one or more air gaps therein, the resulting change in the magnetic flux being arranged to influence one or more suitably disposed coils connected to a measuring instrument or the equivalent.

It has been proposed, in such apparatus, to arrange a pair of similar normally balanced magnetic circuits partly on one element and partly on the other element so that the flux density or distribution of flux or both is varied in both circuits by relative movement of the elements, the disturbance of equilibrium of the magnetic circuits being measured by a suitable indicating instrument. It has also been suggested to provide in such an arrangement, a similar second pair of magnetic circuits, the equilibrium of which can be disturbed by hand or otherwise so that by connecting the two pairs in opposition to an indicating instrument, the instrument shows by a "null" indication when the equilibrium of the two pairs of magnetic circuits is disturbed by the same amount. The disturbance of the equilibrium of the second pair of circuits required to produce the "null" indication thus affords a direct measure of the disturbance of the equilibrium of the first pair by the movement to be measured.

Difficulties have been experienced with apparatus of the aforesaid kind owing to inaccuracies which are introduced when there are components of movement other than the selected component. These difficulties become particularly marked when the apparatus is applied to torsion dynamometers or thrust-meters of the transmission type which operate at relatively high speeds— for example when employed in aircraft engines— and there are appreciable relative movements of the two elements in several directions due, for example, to shaft whip or vibration, axial misalignment or other causes. An object of the present invention is to provide improved electromagnetic measuring apparatus of the above kind from which it is possible to obtain readings of the selected component which are substantially independent of or unaffected by other components of relative movement of the two elements concerned.

Yet another object of the invention is to provide a magnetic measuring apparatus in which three or more magnetic systems or circuits are mounted with part of each magnetic system on one of the relatively movable elements and part of each system on the other element so that the several systems are symmetrically disposed with respect to the selected component of movement and relative movement of the two elements varies the magnetic reluctance of the several systems, means being provided responsive to changes in the reluctance of the systems and so arranged that changes in reluctance of the several systems produced by the selected component of movement are additive whilst changes due to other components of movement balance out. Each of the several magnetic systems may be provided with multiple air gaps and coils responsive to variations of magnetic flux in the associated system, the coils of the several systems being so interconnected that voltages induced therein by variations of magnetic flux due to changes in the lengths of the air gaps, are additive when the changes are produced by the selective component of movement and substantially balanced out when produced by other components of movement.

When it is desired to measure the relative angular movement between two substantially coaxial elements each magnetic system may have, between the parts on the two elements, at least one circumferential air gap and one radial air gap (or an air gap having circumferential and radial components). The coils of the several systems are then so interconnected that changes in the voltages induced therein due to changes in the lengths of the circumferential air gaps are additive whilst changes in the induced voltages due to changes in the lengths of the radial air gaps substantially balance out. When the relative movement to be measured is a translational one, the several systems are symmetrically disposed about an axis parallel to the direction of movement and in each system there are, between the parts on the two elements, at least one air gap parallel to the axis and one air gap perpendicular to the axis (or an air gap having components parallel and perpendicular to the axis), the coils being so interconnected that changes in the voltages induced due to changes in the lengths of the air gaps parallel to the axis are additive whilst changes in the voltages due to changes in the lengths of the other air gaps substantially balance out.

In the above definition of the invention and throughout the specification air gaps are specified in terms of the direction of the length of the gap measured along the lines of magnetic flux which pass across it. Thus, for example, a "circumferential" air gap is one in which the length, as defined above, lies along the circumference of a circle whilst a "radial" air gap is one in which the length of the air gap lies along a radius of a circle. In the case of the apparatus for measuring angular movement referred to above, the appropriate circle has its centre on the axis of rotation and lies in a plane perpendicular to this axis.

Preferably each magnetic system comprises a pair of similar normally balanced magnetic circuits arranged so that the selected component of movement causes a change in the length of an air gap in each circuit, the changes in the air gaps in the two circuits being in opposite senses.

In one convenient construction each system comprises a substantially U-shaped main body or core of magnetic material connected to one element and an armature disposed between the limbs of the core and connected to the other element. Preferably the core is so magnetised as to form two magnetic circuits one of which includes the air gap between the armature and one of the limbs of the core and the other the air gap between the armature and the other limb of the core, an air gap formed between the armature and the yoke connecting the limbs of the core being common to both magnetic circuits. Preferably each magnetic system is provided with two coils respectively responsive to changes of magnetic flux in the two circuits of the system, the two coils being connected in opposition and the opposed pairs of coils of the several systems being connected in series.

Figure 2:
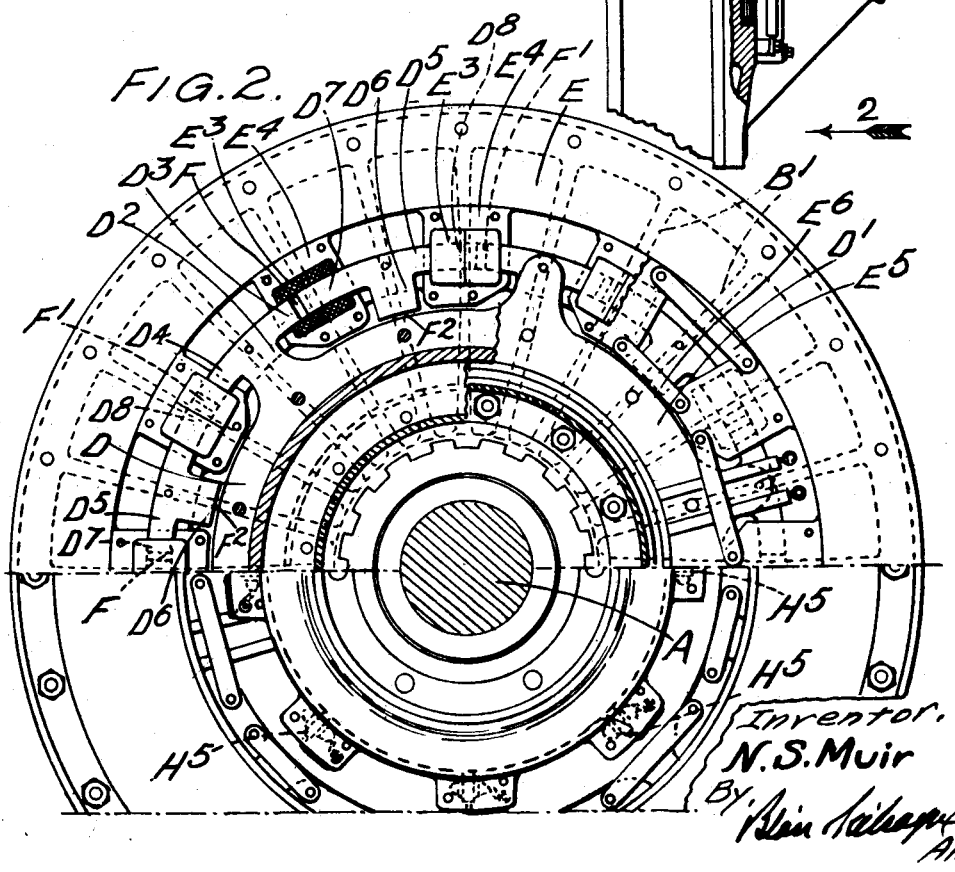
Figure 5:
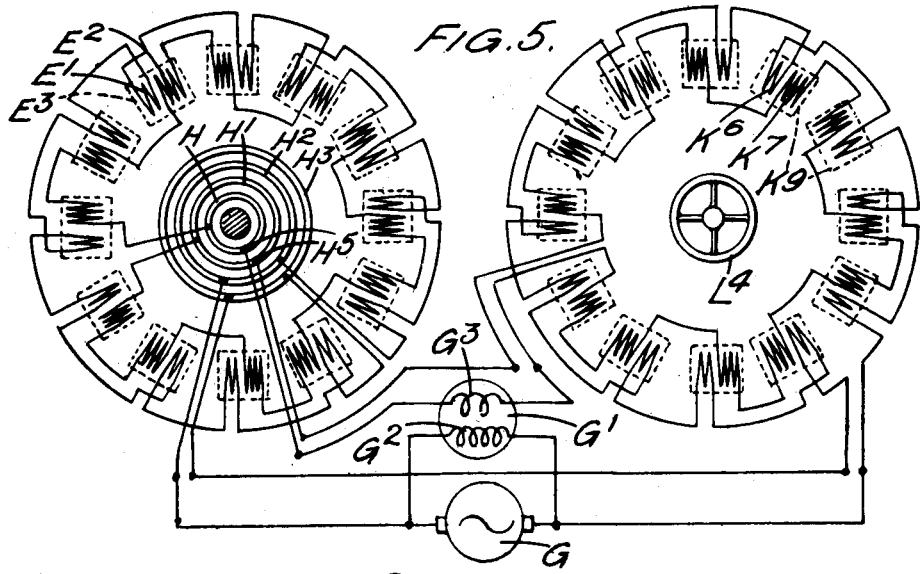

The following is a description, by way of example, of several convenient constructions of transmission dynamometer and electromagnetic measuring apparatus according to this invention with reference to the accompanying drawings, in which Figure 1 is a side elevation, partly in section, of one construction arranged for torque measurements in the transmission system between the engine and the airscrew of an aircraft, Figure 2 is an end elevation, also partly in section, in the direction of the arrows 2—2 of Figure 1, Figure 3 is a front elevation, partly broken away, of part of the measuring apparatus, Figure 4 is a side elevation, partly in section, of the apparatus shown in Figure 3, Figure 5 is a wiring diagram showing the electrical connections of the apparatus shown in Figures 1 to 4, Figure 6 is an elevation, partly in section of a modified form of the measuring apparatus shown in Figures 3 and 4, Figures 7 and 8 are respectively side and end elevations, partly in section, of a modified form of the dynamometer shown in Figures 1 and 2 provided with a damped spring, Figure 9 is a side elevation, partly in section, of a modified form of the dynamometer shown in Figures 1 and 2, Figure 10 is a side elevation, partly in section, of the dynamometer shown in Figure 9 provided with a damped spring, and Figure 11 is a side elevation, partly in section, of a modified form of the dynamometer shown in Figure 9.

In the construction shown in Figures 1 to 5, which is for measuring angular movements, as, for example, in a torsion dynamometer, the apparatus is used for measuring relative movements between the hub and the rim of a radial-spoke type spring which forms part of a transmission system between an aero-engine and the airscrew.

Thus, referring to Figures 1 and 2, the drive from the shaft A of the engine (not shown) is transmitted to a boss $A^1$ for the airscrew $A^2$, partly indicated in chain lines in Figure 1, through a spring of the radial-spoke type having a hub B keyed or otherwise rigidly connected to the shaft A, spokes $B^1$ projecting radially from the hub B and an annular rim $B^2$ connected to the outer ends of the spokes. The rim $B^2$ is connected by an annular plate $B^3$ to the flange of the airscrew boss $A^1$. Thus, during operation the drive is transmitted through the spokes $B^1$ which deflect by an amount dependent upon the torque transmitted to the airscrew. These spokes are preferably relatively stiff in directions parallel to the shaft axis but flexible in a plane perpendicular to this axis and each spoke preferably tapers slightly, as shown in Figures 1 and 2, from each end towards the centre so as to obtain substantially uniform bending stress along each spoke.

The apparatus for measuring the relative movement between the hub B and the rim $B^2$ is disposed on the side of the spring remote from the airscrew boss $A^1$. This apparatus comprises an annular plate D of laminated magnetic material rigidly supported on a non-magnetic ring $D^1$ connected by bolts to a flange on the hub B, the arrangement being such that the axis of the plate D is concentric with the axis of the engine shaft A. The plate D constitutes a main core or yoke and has a number of radial arms $D^2$ symmetrically disposed around its periphery. Six arms $D^2$ are provided in the construction shown in Figures 1 and 2, and whilst there may be more or less than this number, there must be at least three of such arms in order to obtain the requisite symmetrical arrangement of the magnetic systems. Formed integral with each arm $D^2$ is a cross member of substantially arcuate shape having ends $D^3$ and $D^4$ which project into the spaces on each side of the arm towards the adjacent arms so as to form poles for cooperating with armatures $D^5$ disposed in the space between the arms and mounted on an annular supporting spider or plate E which is bolted to the rim $B^2$. If desired, the poles $D^3$ and $D^4$, instead of being formed integral with the arms $D^2$ as shown, may consist of arcuate members or bars of magnetic material fixed in any suitable manner to the ends of the arms.

Each armature $D^5$ consists of laminated soft iron, is approximately T-shaped and is so mounted on the plate E that the upright portion $D^6$ of the T projects inwardly in a radial direction towards the shaft A and the cross member, which is arcuate, extends circumferentially between the poles $D^4$ and $D^3$ on the arms $D^2$, there being a circumferential air gap F between one end $D^7$ of the armature and the pole $D^3$, and a circumferential air gap $F^1$ between the other end $D^8$ of the armature and the pole $D^4$. There is also a radial air gap $F^2$ between the inner end of the part $D^6$ of the armature and the part of the periphery of the core D between the arms $D^2$.

Thus, angular movement of the hub B with respect to the rim $B^2$, i. e. the selected component of movement, causes the core D with its poles $D^4$ and $D^3$ to move with respect to the armatures $D^5$ so that the length of the circumferential air gap at one end of each armature is increased whilst the length of the corresponding air gap at the other end of each armature is decreased. Thus, for example, if the shaft A is rotating in a clockwise direction, as viewed in Figure 2, the airscrew will be driven in the same direction but the torque transmitted through the spring will cause the spokes $B^1$ to deflect in a direction such that the length of the air gaps F decreases, whilst the length of the air gaps $F^1$ increases. The length of the radial air gaps $F^2$ is not altered by such movement. If, however, there are, for example, oscillations in the transmission system which cause relative movements of the hub B and the rim $B^2$ in planes perpendicular to the axis, i. e. components of movement other than the selected component, the lengths of the radial air gaps $F^2$ vary at different positions around the shaft A, some of the gaps increasing and others correspondingly decreasing. The lengths of such of the circumferential air gaps F and $F^1$ as alter, due to such oscillations or such small alterations as there may be, are balanced out in the several symmetrically arranged systems.

The several systems are magnetised by passing an intermittent or alternating current from an appropriate generator, indicated at G in Figure 5, through coils $E^1$ (Figure 5), these coils being so arranged that each armature $D^5$ forms part of one magnetic system and each system has two magnetic circuits. There are thus a number of magnetic systems (six in the construction illustrated in Figures 1 and 2) corresponding to the number of armatures D symmetrically disposed around the shaft A.

In each magnetic system the flux in one magnetic circuit passes from a pole $D^3$ across the adjacent circumferential air gap F to the end $D^7$ of the adjacent armature $D^5$, through the radial member $D^6$ of the armature, across the radial air gap $F^2$ and back through the core D and the appropriate arm $D^2$ to the pole $D^3$. The other magnetic circuit of the system is similar to that described above but includes the circumferential air gap $F^1$ at the other end of the armature and the pole $D^4$ and radial arm $D^2$ associated therewith.

It is to be noted that the radial air gap $F^2$ and the radial member $D^6$ of each armature $D^5$ form part of both the magnetic circuits of the associated system and also that each arm $D^2$ of the core D forms part of one of the magnetic circuits of the system on each side of such arm. Accordingly the several magnetising coils $E^1$ are connected to the generator G in series with one another in the appropriate sense for the magnetic fluxes of two magnetic circuits which in part have a common path (e. g. in the radial member $D^6$ of an armature and the air gap $F^2$ or in an arm $D^2$ of the core) to be in the same direction in such common path. The initial lengths of the air gaps F, $F^1$ and $F^2$ and the excitation are so chosen that the flux densities in the armatures and the core (even when there is maximum angular movement and one air gap F or $F^1$ of each armature is very short) do not approach the saturation value. Thus, the variations in the mean flux in the two magnetic circuits of a system are approximately directly proportional to the variations in the lengths of the circumferential air gaps of the system.

Each of the magnetic circuits is provided with a coil $E^2$ (Figure 5) which is so mounted that it is responsive to changes in the magnetic flux in the circuit, this coil being hereinafter referred to as the secondary coil to distinguish it from the magnetising or primary coil of the circuit. The primary and secondary coils $E^1$ and $E^2$ of each magnetic circuit are preferably, as shown in Figure 2, mounted together so as to form a single tubular coil unit $E^3$ surrounding the air gap $F$ or $F^1$ of the associated magnetic circuit and clamped in suitably shaped holders $E^4$ supported by the plate $E$, the several primary coils $E^1$ being connected together by copper straps $E^5$ and the secondary coils $E^2$ by straps $E^6$. The primary and secondary coils $E^1$ and $E^2$ may be wound side by side as indicated diagrammatically in Figure 5, either on a single former or on separate formers. Preferably, however, alternate layers of primary and secondary turns are wound on a single former or each coil is made of a series of flat coil units, the units of the primary and secondary windings being arranged alternately, or any other convenient winding arrangement is adopted so as to obtain a high degree of inductive coupling between the primary and secondary windings.

The two secondary coils $E^2$ of each magnetic system are connected in opposition so that when the two air gaps $F$, $F^1$ of the system are equal, there is no secondary output. When there is relative angular movement between the hub $B$ and the rim $B^2$, the increase in length of one air gap, say the gap $F^1$, and the corresponding decrease in the other air gap ($F$) of each system, disturbs the balance of the secondary voltages induced in the coils $E^2$ (due to the current flowing in the primary windings $E^1$) and the out-of-balance voltage produced is a measure of the mean angular movement and, in the appropriate cases, of the torque transmitted through the spring. The opposed pairs of coils $E^2$ of the several systems are, as shown in Figure 5, connected in series so that the out-of-balance voltages are additive and thus produce a total output voltage which is a measure of the mean variation in length of the circumferential air gaps $F$, $F^1$ of all the systems. It will be appreciated that when there are torsional oscillations of the engine shaft-airscrew system the air gaps $F$ and $F^1$ will vary about a mean position and that whilst such oscillations will modulate the output voltage, the mean voltage will depend on the mean variation in the lengths of the gaps.

When there are radial oscillations in the transmission system or there is slight axial misalignment between the engine shaft $A$ and the airscrew boss $A^1$, the radial air gaps $F^2$ will vary correspondingly and thus produce alterations in the out-of-balance voltages derived from the individual pairs of coils $E^2$. Since, however, the magnetic systems are symmetrically disposed about the axis of the shaft $A$, any radial displacement which causes an increase in the secondary output voltage from the coils of the system or systems on one side of the axis will cause a corresponding decrease in the output voltages derived from the coils of the system or systems on the diametrically opposite side of the axis. Thus, by reason of the series connection of the coils $E^2$, the variations due to radial displacement will balance one another so that the resultant output voltage is independent thereof. Thus, the apparatus is rendered substantially independent of relative movements of the hub $B$ and the rim $B^2$ other than relative angular movements about the axis.

Frequently, however, it is desirable to reduce as far as possible current flow in the secondary coils and associated circuits. This is particularly so in apparatus having rotating magnetic systems to which connections have to be made through slip rings as in the construction shown in Figures 1 and 2, in which connections to the primary and secondary coils are made through slip rings $H$, $H^1$, $H^2$, $H^3$ (Figure 1) mounted on a tubular member $H^4$ arranged to rotate with the shaft $A$. Even when, as is usual, in such an arrangement, variations due to brush vibration are reduced by providing each slip ring with three or more brushes ($H^5$) spaced around its periphery, the current flowing causes voltage drops which vary with the output voltage and consequently with angular movement. Thus the readings must be corrected and the corrections necessary are difficult to make, particularly when measurements are made at varying speeds.

Accordingly measurement of the relative movement is preferably effected by a "null deflection" method of the known general type which is referred to above. To this end the output circuit from the secondary coils of the several magnetic systems of the apparatus shown in Figures 1 and 2, which, for convenience of description will be referred to as the transmitter, is connected to the output circuit of a "receiver" which is shown in Figures 3 and 4 and comprises a set of magnetic systems which are as similar as is practically possible in characteristics and arrangement to the magnetic systems of the transmitter. The receiver is provided with a main core $J$ having radial arms $J^1$ with poles $J^2$ and $J^3$, the dimensions of the core with its arms and poles being the same as the corresponding dimensions of the core $D$ of the transmitter. The receiver is provided with T-shaped armatures $K$ similar in dimensions, shape and arrangement to the armatures $D^5$ so that there are circumferential air gaps $F^3$ and $F^4$ respectively between the pole $J^2$ and one end $K^2$ of an armature and between the pole $J^3$ and the other end $K^3$ of the same armature and a radial air gap $F^5$ between the upright member $K^1$ of the armature and the part of the core $J$ between adjacent arms $J^1$.

The magnetic systems of the receiver are arranged so that their air gaps $F^3$ and $F^4$ can be varied by rotating a hand wheel or other manually operable control device. Thus, as clearly shown in Figure 4, the receiver has a main tubular supporting shaft $L$ on which is mounted a sleeve $L^1$ capable of sliding along the shaft but prevented from rotating thereon by a key. The sleeve $L^1$ has at one end (the front end) a flange $L^2$ connected through a ball bearing to an externally screwthreaded cylindrical member $L^3$ connected at its front end to a hand wheel $L^4$. The screwthread on the member $L^3$ engages with an internal screwthread in a sleeve $L^5$ which is fixed on arms $L^7$ extending axially from the end of a tubular member $L^6$ fixed to the rear end of the supporting shaft $L$. When the hand wheel $L^4$ is rotated, the sleeve $L^3$ is rotated relatively to the fixed member $L^5$ and the engaging screwthreads cause longitudinal movement of the member $L^3$ and a corresponding movement of the sleeve $L^1$ connected thereto, the whole arrangement constituting a reduction drive whereby a large rotational movement of the hand wheel $L^4$ produces a relatively small longitudinal movement of the sleeve $L^1$.

Mounted on the rear end of the sleeve $L^1$ is a supporting spider $J^4$ for the magnetic core $J$. The spider $J^4$ is provided with slots through which the arms $L^7$ pass, the arrangement being such as to permit the requisite rocking movement of the spider $J^4$ about the axis of the shaft $L$ for varying the air gaps $F^3$ and $F^4$. Axial movement of the spider J⁴ on the shaft L is prevented by thrust bearings arranged between the spider J⁴ and radial flanges L⁸ and L⁹ on each side thereof, the flange L⁸ being formed integral with the member L⁶ and the flange L⁹ screwed on to the ends of the arms L⁷. The hub of the spider J⁴ engages the sleeve L¹ in such a manner (e. g. as by inclined cam surfaces or a quick-pitch screwthread arrangement), that longitudinal movement of the sleeve along the shaft L causes rotational or rocking movement of the spider J⁴. Owing to the reduction drive referred to above a relatively large movement of the hand wheel L⁴ produces only a small rocking movement of the spider J⁴ and the core J carried thereby. The armatures K are carried by a plate K⁴ fixed on the member L⁶ and having a pointer K⁵ which cooperates with a disc-like scale L¹⁰ arranged to move with the hand wheel L⁴. In order to ensure positive movement of the spider J⁴ as the sleeve L¹ moves longitudinally, the cooperating parts (e. g. cams and slots or screwthreads of the quick-pitch type) on the hub of the spider J⁴ and on the sleeve L¹ are maintained in engagement by springs J⁵ connected between the plate K⁴ and pins J⁶ carried on the spider J⁴ and passing through slots in the plate K⁴, the pins J⁶ also acting as stops to limit the permissible movement of the core J. The hand wheel L⁴ is protected by a disc-like shield L¹¹ keyed to the shaft L.

The receiver is provided with primary and secondary coils K⁶ and K⁷ (Figure 5) which are preferably, as in the transmitter, arranged as single tubular coil units K⁸, there being one of such units mounted around each of the air gaps F³ and F⁴. As shown in Figure 5, the primary coils K⁶ of the receiver are energised from the source G in series with the primary coils E¹ of the transmitter. The secondary coils K⁷ of the receiver are connected so that the two coils of a system are in opposition and the several pairs are connected in series. The output circuits from the transmitter and the receiver are connected in opposition in series with a sensitive electrical measuring instrument G¹ (Figure 5) the impedance of which should be matched with that of the associated circuit so as to obtain maximum sensitivity. The measuring instrument G¹ is preferably, as shown, of the dynamometer type having one coil G² energised by alternating current supplied from the source G either in parallel with the primary coils as shown or, if desired, in series therewith. The other coil G³ is connected in series with the output circuits from the transmitter and receiver.

When there is no angular movement to be measured and the receiver is in its mid position, there is no output from either the receiver or the transmitter and the pointer of the instrument G¹ (which preferably has a central zero position so as to give a directional indication) remains in the zero position. When the torque is transmitted through the spring, there is relative movement between the hub B and rim B² and the resultant output voltage of the transmitter secondary coils causes a deflection of the pointer of the instrument G. The hand wheel L⁴ of the receiver is then operated to alter the air gaps F³ and F⁴ of the receiver in the appropriate direction until electrical balance is restored and there is no deflection.

The movement of the receiver air gaps F³ and F⁴ to restore balance is equal to the mean movement of the transmitter air gaps F and F¹ due to the mean relative movement between the hub B and rim B², and thus the movement of the hand wheel L⁴ which is required provides a direct reading of the mean movement to be measured. The movement of the hand wheel is indicated by the reading on the disc L¹⁰ opposite the pointer K⁵, any suitable vernier or other device (not shown) being fitted, if required.

The source of alternating current G used for energising the primary coils E¹ and K⁶ should have a frequency appreciably above the frequency of any mechanical oscillations likely to occur in the power transmission system on which measurements are being made, this A. C. frequency preferably being at least ten times the highest frequency of any appreciable vibrational movement likely to occur. Thus, in the case, for example, of the torsion dynamometer shown in Figures 1 and 2, the A. C. frequency used should be relatively high, say, 1500 to 5000 cycles per second. The exciting current may be supplied from any suitable source having its frequency stabilised and capable of supplying a constant voltage. This source may, for example, comprise a permanent magnet alternator or a valve oscillator and should preferably have a sinusoidal voltage output. When an intermittent D. C. is used, instead of A. C., it may be supplied from a battery or other suitable source through a rotary commutator driven at the speed necessary to produce the desired impulse frequency.

The coil windings and the initial settings of the air gaps are preferably chosen to suit the operating characteristics and other properties of the transmission system and/or shaft or spring with which the apparatus is being used. It has been found that the accuracy of the readings is increased if a step-up ratio is used between the primary and secondary coils (E¹:E² and K⁶:K⁷) as this increases the secondary voltage output for a given change in air gap length. The relation between the output voltage and air gap for each transformer is of a generally hyperbolic nature and although the difference of voltage will be linear at a point where the curvature of the two characteristics happens to be the same, at other points non-linearity will arise. By suitably choosing the transformation ratios of the two pairs of coils on each magnetic system the relative curvature of the two characteristics in relation to the point where the output voltages are equal can be varied in such a way that the resulting output voltage from the two opposed coils of a system has a substantially linear characteristic, i. e. is directly proportional to the changes in lengths of the circumferential air gaps (F and F¹), provided that the apparatus is arranged so that the movements to be measured always take place in one direction from the mid position in which the output voltages are equal. The winding ratios can, when necessary, be selected so as to compensate for non-linearity of the torque-deflection characteristic of the part of the transmission system across which the apparatus is connected, as may, for example, be necessary when the measurements are made, as in the construction described above, of the deflection of spokes B¹ between the hub B and rim B² of a radial-spoke type spring. From the foregoing it will readily be appreciated that the characteristics of the improved measuring apparatus according to this invention can be matched to suit any desired type of spring, and that when so matched the apparatus gives an accurate measure of the mean value of a fluctuating torque.

With a radial-spoke spring as shown in Figures 1 and 2 stops (not shown) are conveniently provided to limit the deflection of the spring, and it is usually preferable so to arrange these stops that when the air gaps F, F¹ are equal, the spring engages its negative stop, the setting of the measuring apparatus and the stops being such that whilst the gaps are equal when the spring engages its negative stop, the spring lies between the stops when there is no applied torque. This ensures that during deflection of the spring due either to positive or negative torque, the gaps do not move through the "equal" position and thus a phase change of the output voltage, which might introduce errors in integration, is prevented. Obviously in such an arrangement the indicating dial $L^{10}$ or the equivalent on the receiver may be calibrated so as to read "zero torque" when the position of the receiver corresponds to the zero torque position of the transmitter, notwithstanding the fact that the circumferential air gaps F F¹ and F³ F⁴ of each electrical system of both the transmitter and the receiver are unequal in the zero torque position.

Figure 6:
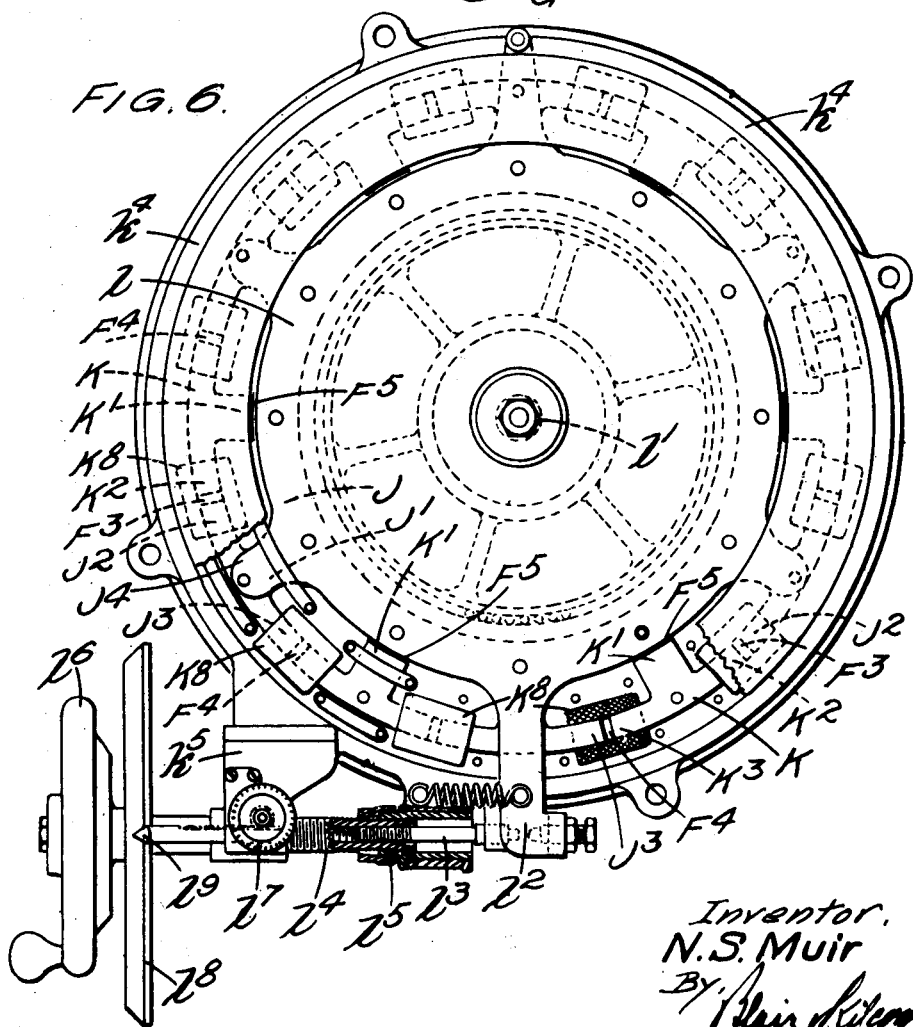

Figure 6 shows an alternative form of receiver, which is preferably employed, in which the magnetic systems are similar to those of the arrangement shown in Figures 3 and 4 but which differs from that shown in these figures in the means for effecting relative movement between the core and the armatures.

Thus, as shown in Figure 6, in which parts corresponding to parts of the apparatus shown in Figures 3 and 4 are given the same reference letters, the core J is supported on a plate $l$ rotatably mounted on ball bearings on a fixed shaft $l^1$ whilst the armatures K are carried on a fixed plate $k^4$ keyed to the shaft $l^1$. A ball thrust bearing (not shown) is provided between the plates $l$ and $k^4$, the arrangement being such as to prevent all relative movement of the two plates other than angular or rocking movement.

Rocking movement of the plate $l$ relative to the plate $k^4$ to effect the desired alteration in the lengths of the air gaps F³ and F⁴ is effected by means of a radial arm $l^2$ extending from the plate $l$ and moved relatively to a fixed member $k^5$ on the plate $k^4$ by "slow motion" screw mechanism. This mechanism comprises a screw-threaded rod $l^3$ having one end fixed to the arm $l^2$ and the other end engaging in an internally screwthreaded sleeve $l^4$. This sleeve is also externally screwthreaded to engage in an internally screwthreaded collar $l^5$ rigidly connected to the plate $k^4$. The pitches of the screwthreads on the inside and outside of the sleeve $l^4$ differ from one another and, moreover, are of the same "hand". Thus at each rotation of the sleeve $l^4$, the arm $l^2$ is moved towards or away from the member $k^5$ by an amount depending on the difference in the pitches of the two screwthreads, movement of the arm $l^2$ effecting a corresponding rocking movement of the plate $l$ and the core carried thereby. A hand wheel $l^6$ is provided for rotating the sleeve $l^4$ and the amount of movement of the arm $l^2$ is recorded by a counting device $l^7$ which indicates the number of revolutions of the sleeve $l^4$ in conjunction with a disc $l^8$ which is attached to the hand wheel $l^6$ and cooperates with a pointer $l^9$ fixed to the member $k^5$ to indicate fractions of a revolution of the hand wheel $l^6$ and sleeve $l^4$. In other respects this receiver is similar to that shown in Figures 3 and 4 and thus it need not be described in further detail.

It will be appreciated that this operating mechanism provides a very accurate means of obtaining and measuring very small movements of the core J relative to the armatures K and that it avoids all backlash or variable factors which sometimes arise in the arrangement shown in Figures 3 and 4 even when this apparatus is, as described, provided with the springs $J^5$.

Figure 7:
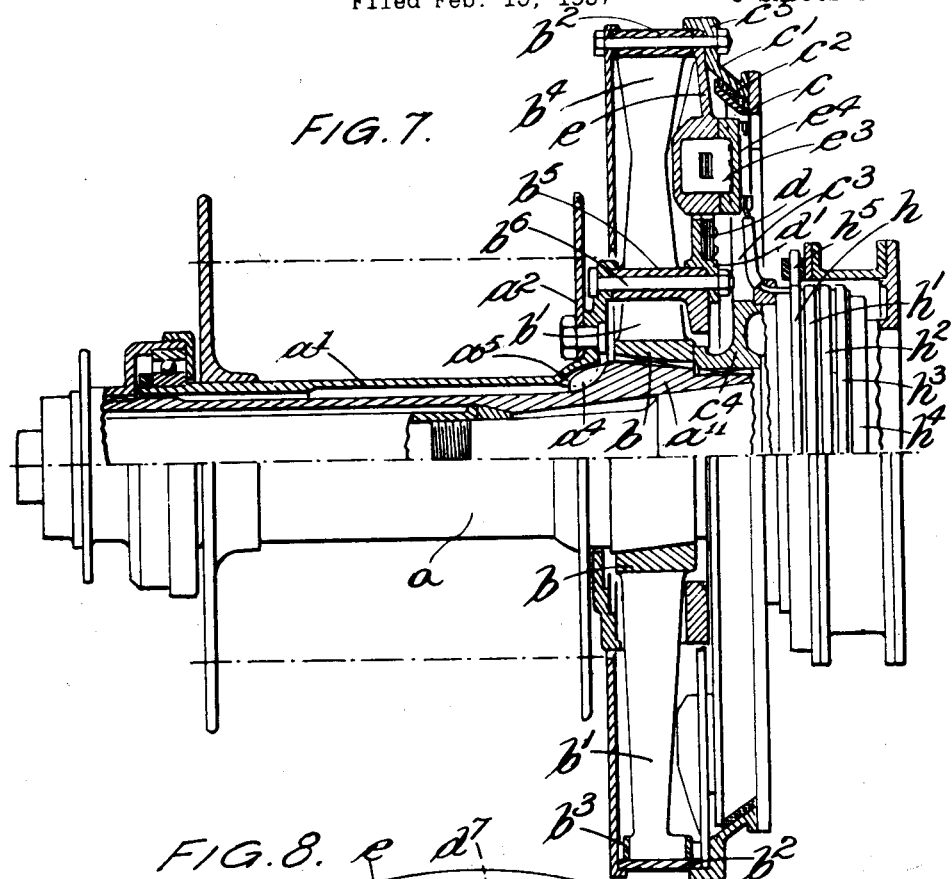
Figure 8:
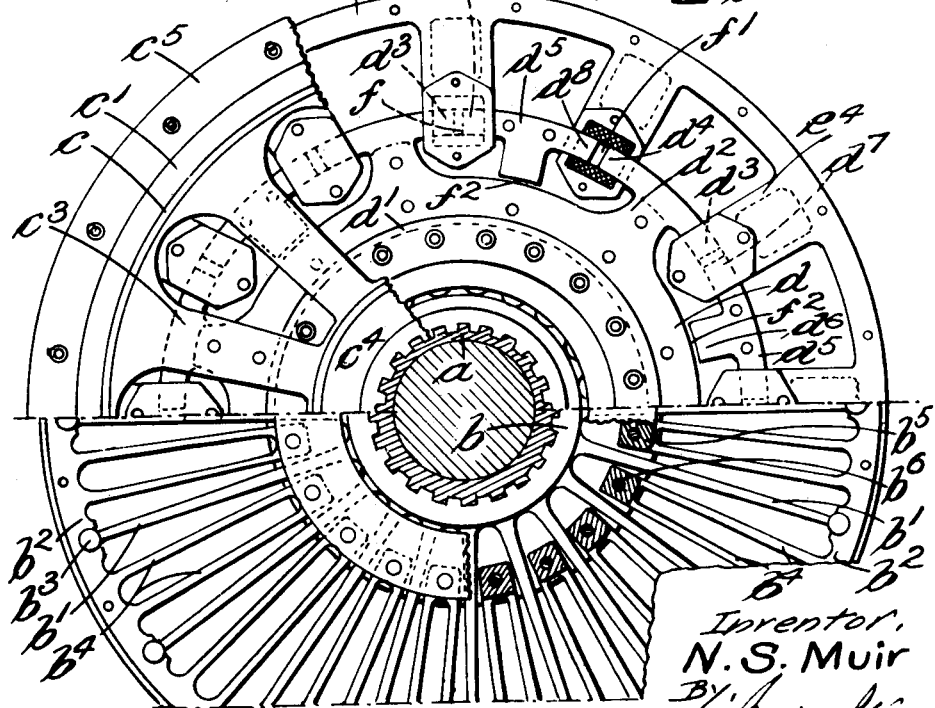

When it is desired substantially to avoid any inaccuracies which may be introduced due to the modulation of the output voltage by torsional oscillations of the transmission system, the arrangement shown in Figures 7 and 8 may be employed in which the transmission includes two springs one of which is damped whilst measurements are made across the other.

In this construction, which, as it is generally similar to that shown in Figures 1 and 2, has corresponding parts indicated by reference letters which are similar but are small instead of capital letters, the shaft $a$ is provided with a hollow extension $a^{11}$ to which is keyed or otherwise connected between the engine and the boss $a^1$ a hub $b$ having formed integral therewith blade-like radial spokes $b^1$ which are relatively springy in a plane perpendicular to the axis of the shaft and stiff in planes parallel to this axis. The outer ends of the spokes $b^1$ are connected to an annular rim $b^2$ which may be formed integral with the spokes but is preferably, as shown, formed separately therefrom and provided with slotted rotatable trunnions $b^3$ (Figure 8) parallel to its axis to receive the ends of the spokes. This connection between the ends of the spokes $b^1$ and the rim $b^2$ has the advantage that it permits axial movement of the rim relatively to the spokes whilst ensuring that deflection of the spokes due to the transmission of power through them, causes relative angular movement between the hub $b$ and the rim $b^2$.

The rim $b^2$ has rigidly connected thereto or formed integral therewith, a set of inwardly projecting radial spokes $b^4$ which are so spaced that they are interleaved with the spokes $b^1$. There may be the same or different numbers of spokes in each set, but each set must be symmetrical about the axis and the spokes of one set must not be in contact with the spokes of the other set. As shown in Figure 8, there are two spokes $b^4$ between each of the spokes $b^1$. The inner ends of the two spokes $b^4$ between adjacent spokes $b^1$ unite to form a boss $b^5$ which is attached by bolts $b^6$ to an annular flange $a^2$ forming part of the airscrew boss.

During operation, torque is transmitted from the engine shaft $a$ through the hub $b$ and its spokes $b^1$ to the rim $b^2$, and from the rim $b^2$ through the second set of spokes $b^4$ to the airscrew boss $a^1$. The two sets of spokes $b^1$ and $b^4$ thus constitute two springs in series in the transmission system. The spring constituted by the spokes $b^1$ is damped, whilst deflections of the spring consisting of the spokes $b^4$ are measured.

The flexibility of the spring (spokes $b^4$) across which measurements are made is determined by general mechanical design and the amount of deflection required, whilst the flexibility of the damped spring (spokes $b^1$) should be such as to ensure that the effects of critical speed are reduced to a safe value. In addition the flexibility of both springs in planes perpendicular to the axis should be such that they will transmit the maximum torque likely to be required without deflecting sufficiently for adjacent spokes to come into contact. Preferably cooperating stops $a^4$ and $a^5$ are provided on the sleeve $A^{11}$ and airscrew boss $a^1$ to limit the possible relative angular movement between the shaft and the boss, thus preventing the spokes $b^1$ and $b^4$ deflecting sufficiently to come into contact in the event of a sudden shock to the transmission system. The spokes of one or both springs may, as shown, be tapered, preferably parabolically, from each end towards an intermediate point (at which the cross-section of the spoke is a minimum) so as to obtain substantially uniform bending stress along each spoke. If desired, any other suitable shape or form of spoke may be used.

The damping device for the spokes $b^1$ is connected between the hub $b$ and the rim $b^2$. This device serves to damp the oscillations in the drive and also acts, in the known manner, to reduce torsional vibrations which develop in the crankshaft-airscrew system. The damping is effected by two frusto-conical rings $c$, $c^1$ which fit one inside the other with sufficient clearance for a lining $c^2$ of a suitable friction material to be disposed between them and, if desired, fixed to one of the rings, the cooperating surfaces of the two rings being substantially parallel to one another. The inner ring $c$ is connected by rigid spokes $c^3$ to a hub $c^4$ keyed on the sleeve $a^{11}$, whilst the outer ring $c^1$ is provided with a flange $c^5$ bolted to the rim $b^2$, the arrangement being such that both rings are coaxial with the shaft $a$. The friction between the two cooperating surfaces of the rings $c$, $c^1$ and the friction lining $c^2$ thus tends to damp relative movements of the hub $b$ and the rim $b^2$, particularly when such movements vary rapidly as, for example, during torsional oscillations.

The pressure on the friction lining $c^2$ may be varied to adjust the degree of damping by axial movement of one or both rings, this arrangement having the advantage that, apart from ease of adjustment, the damping tends to vary in accordance with the load due to airscrew thrust. As it is desirable that the damping torque should be the correct proportion of the vibrational torque to be smoothed, and as it often happens in dynamic systems that the more serious critical vibrations occur at low speeds, it is sometimes preferable to ensure that the heavier damping is obtained at the lower speeds. On the other hand in other cases it may be desirable that the heavier damping should occur at higher values of airscrew thrust. The disposition of the conical engaging surfaces of the rings $c$ and $c^1$ will depend on whether the damping load is to be relieved or reduced by airscrew thrust or whether it is to be increased. Thus in Figure 7 the damping increases with increase of airscrew thrust and this is obtained by so disposing the conical engaging surfaces of the rings $c$ and $c^1$ that any axial movement of the rim $b^2$ due to airscrew thrust tends to move the rings towards one another and thus increase the pressure on the friction lining $c^2$.

Connected between the rim $b^2$ and the airscrew boss $a^1$ is the apparatus for measuring the relative movement between these two members. Preferably this apparatus is as shown in Figures 7 and 8 of the same kind as is employed in the dynamometer shown in Figures 1 and 2. The variation in the air gaps due to relative movement of the rim $b^2$ and inner ends of the spokes $b^4$, between which the measuring apparatus is connected, may be measured by a "null" deflection method using a receiving apparatus of the kind shown in Figures 3 and 4 or Figure 6.

It will readily be appreciated that the magnetic measuring apparatus described above can be employed with any suitable form of spring or equivalent member forming part of a torsion dynamometer of the transmission type. Thus, for example, as shown in Figures 9, 10 and 11, it can be associated with airscrew transmissions of the quill shaft type.

In the arrangement shown in Figure 9, the airscrew boss $A^3$ is mounted on roller bearings on the engine shaft $A^4$, which is provided at its outer end with a hollow extension $A^{10}$ to which is keyed one end of a hollow shaft M projecting beyond the boss $A^3$. The shaft M is surrounded by another hollow shaft $M^1$ having at its inner end a flange $M^2$ provided with a rim $M^3$ connected to a flange at the outer end of the airscrew boss $A^3$. The shafts M and $M^1$ are coaxial and are provided at their outer ends with cooperating flanges connected together by bolts $M^4$. The shafts M and $M^1$ thus constitute a springy transmission link between the engine shaft $A^4$ and the airscrew boss $A^3$ and, during operation, there is relative movement between the inner end of the shaft M and the rim $M^3$, the amount of such movement depending upon the torque being transmitted. The magnetic measuring apparatus, which is similar to that shown in Figures 1 and 2, is disposed in the space between the inner end of the shaft M and the rim $M^3$, the core D of the apparatus being mounted on a flange $M^5$ on the shaft M and the armatures $D^5$ (not shown) on an annular plate $E^7$ similar to the plate E.

As in the construction shown in Figures 1 and 2, the plate $E^7$ supporting the armatures also carries coil units $E^3$, each of such units having primary and secondary coils. Connections from the coils are led through bores in clamping bolts $A^5$ for the airscrew $A^6$ to radially arranged slip rings $H^7$ mounted on a disc of insulating material carried by a flange connected to the hollow extension $A^{10}$ of the engine shaft $A^4$, flexible connections being provided between the slip rings and the bolts $A^5$ so as to permit small relative movements between the airscrew boss $A^3$ and the slip rings. Brushes $H^8$ mounted on a fixed part of the engine (not shown) are provided for the slip rings, there being, preferably, a number of brushes disposed symmetrically around each slip ring so as to reduce to a minimum variations due to brush chatter and similar causes.

Cooperating stops $A^7$ and $M^6$ are respectively provided on the flange at the outer end of the airscrew boss $A^3$ and on the inner end of the shaft M in order to limit the relative movement between these members due to deflection of the shafts M and $M^1$ by the applied torque. In other respects the magnetic measuring apparatus is similar to that described above with reference to Figures 1 to 4 and need not be described in further detail. As with that arrangement, readings may be obtained by a "null deflection" method.

If desired this construction of dynamometer can be provided with a damped spring to absorb torsional oscillations or other transient variations or oscillations in the power transmission system. Thus as shown in Figure 10 in which parts corresponding to those of Figure 9 are given the same reference letters but small letters are used instead of capital letters, the engine shaft $a^6$ has keyed to it the hub $b^7$ of a radial-spoke spring having spokes $b^8$ connected at their outer ends by a rim $b^9$, preferably by means of rotatable trunnions similar to the trunnions $b^3$ of the construction shown in Figures 7 and 8. The engine shaft $a^6$ is also provided with a sleeve $a^{12}$ having a projecting flange $a^{13}$ formed integral thereon. The rim $b^9$ is connected by an annular plate $b^{10}$ to a flange at one end of a sleeve $a^7$ mounted on bearings on an extension of the engine shaft $a^6$ and itself acting as a shaft for the airscrew boss $a^8$ which is mounted on roller bearings on this sleeve. The outer end of the sleeve $a^7$ is keyed to one end of the hollow shaft $m$ which projects beyond the airscrew boss $a^8$ and is surrounded by the hollow shaft $m^1$. The arrangement of the shafts $m$ and $m^1$ and the measuring apparatus is similar to that of the corresponding parts of the construction shown in Figure 9 and need not be described in further detail. During operation there is relative movement between the hub $b^7$ and rim $b^9$ due to deflection of the spokes $b^8$, and also relative movement between the inner end of the shaft $m$ and the rim $m^3$, the amount of deflection of each of these springs depending upon the torque being transmitted.

The spring constituted by the spokes $b^8$ is damped by a device substantially similar to that shown in Figures 7 and 8 and comprising two frusto-conical rings $c^6$ and $c^7$ separated by friction lining $c^8$ and respectively connected to the flange $a^{13}$ and the rim $b^9$. The operation of this damping device is the same as in the construction shown in Figures 7 and 8 and thus need not be described in further detail.

The arrangement shown in Figure 11 differs from that shown in Figure 9 only in the form of the quill shaft drive from the engine shaft to the airscrew boss $A^3$. Thus, in place of the two hollow shafts M and $M^1$, a single quill shaft is employed having an inner cylindrical member $M^7$ and an outer coaxial frusto-conical member $M^8$. The inner end of the member $M^6$ is, like the shaft M of the construction shown in Figure 9, connected to the engine shaft (not shown), whilst the outer end is formed integral with or otherwise connected to the narrower end of the member $M^8$. The wider end of the member $M^8$ is provided with a rim $M^9$ which (like the rim $M^3$) is connected to a flange on the airscrew boss $A^3$. The magnetic measuring apparatus is connected between the rim $M^9$ and the inner end of the member $M^7$. This arrangement is otherwise similar to that shown in Figure 9 and need not be described in further detail. The advantage of a quill shaft having a conical member, as shown in Figure 11, over the somewhat similar arrangement shown in Figure 9 consisting of two coaxial hollow shafts, is that possible backlash and small creep movements at the friction bolts $M^4$ are avoided.

It will be noted that the improved electromagnetic measuring apparatus according to this invention not only has the advantage that it enables a measurement to be obtained which is substantially independent of external or other vibrations of the system or apparatus to which it is applied, but also it is compact and can readily be fitted to existing apparatus at, for example, shaft couplings. Furthermore, owing to its symmetrical form its application does not disturb the balance of a rotating system nor has it itself any "speed" error due to centrifugal force, which, in many forms of dynamometer apparatus as hitherto known, has to be corrected for in so far as this is possible. Yet another advantage of the apparatus is that it is relatively simple to use and does not require expensive and delicate measuring instruments, this advantage being of particular importance when the apparatus is used in aircraft for obtaining values of torque and thrust when flying.

It will be apparent that in the construction of dynamometer having two springs in series the damped spring serves to absorb or smooth out transient variations, for example, torsional resonance in the case of rotating machinery, or cyclic or other variations in the force or torque transmitted due to the characteristics of the engine or other source of driving power or to the nature of the load on the transmission system. The consequent reduction in the amplitude of such variations not only facilitates the measurement of the true mean value of the deflection of the free spring but also simplifies the construction and design of this spring. Another important advantage of this improved dynamometer, particularly when used in rotary machinery, is that it is symmetrical about the axis of rotation and is independent of speed variations.

It is to be understood that the springs used will be so chosen with respect to the force or torque to be transmitted and the general operating conditions that the flexibility of each spring always conforms to predetermined calibrated values and that after deflection the spring across which measurements are made, returns to its original position when the load is removed, without backlash.

What I claim as my invention and desire to secure by Letters Patent is:

1. In a force measuring device for power transmission mechanism, the combination with two transmission elements of the transmission mechanism, of two resilient members connected between the transmission elements so that the torque to be measured is transmitted through said resilient members in series, damping means connected across one resilient member, and measuring means connected across the other resilient member to measure the deflection thereof.

2. In a force measuring device for power transmission mechanism, the combination with two transmission elements of the transmission mechanism, of two resilient members connected between the transmission elements so that the force to be measured is transmitted through said resilient members in series, damping means connected across one resilient member, and measuring means connected across the other resilient member and including at least three magnetic systems affording magnetic circuits symmetrically arranged about the axis and each having parts adapted to be relatively moved to vary the reluctance of the circuit in accordance with the deflection of said other resilient member due to the force to be measured.

3. In a torsion dynamometer for power transmission mechanism, the combination with two rotating transmission elements, namely a driving member and a driven member, of two resilient members connected between the transmission elements so that the torque to be measured is transmitted through said resilient members in series, damping means connected across the resilient member nearer to the driving member, and measuring means connected across the resilient member nearer to the driven member for measuring the deflection thereof.

4. In a torsion dynamometer for power transmission mechanism, an electromagnetic measuring device for measuring relative angular movement between two transmission elements, comprising a plurality of magnetic circuits symmetrically arranged about the axis and including a complete ring of magnetic material extending around the axis and carried by one element and having radial projections, and T-shaped armatures carried by the other element, each having a stem portion and a head portion and being situated between the radial projections so that each end of the head portion forms a circumferential air gap with the adjacent radial projection whilst the stem portion forms a radial air gap with a portion of the ring.

5. In a torsion dynamometer for power transmission mechanism, the combination with two transmission elements of the transmission mechanism, of resilient connecting means connected between said transmission elements so that the torque to be measured is transmitted through said resilient means, and measuring means connected across such resilient means and including at least three pairs of differentially arranged magnetic circuits arranged symmetrically about the axis and each having parts connected respectively to the transmission elements so as to be relatively moved with relative movement between the said elements, relative angular movement between the latter causing the reluctance of one magnetic circuit of each pair to increase whilst the other decreases, a primary winding and a secondary winding arranged to be traversed by each magnetic circuit to constitute a transformer, means for connecting the primary windings in series and supplying a non-uniform current to them, means for connecting the secondary windings in series with the directions of windings such that the voltage changes of the several transformers caused by the movement to be measured are additive whilst the changes produced by other forms of relative movement tend to balance out, the two transformers of each pair of magnetic circuits having different ratios so that the variation of output voltage with variation of torque may be made linear.

6. In a torsion dynamometer for power transmission mechanism, the combination with two transmission elements of the transmission mechanism, of two resilient members connected between the transmission elements so that the torque to be measured is transmitted through said resilient members in series, damping means connected across one resilient member, and measuring means connected across the other resilient member for measuring the deflection thereof, one of such resilient members comprising a plurality of resilient arms extending radially from an inner annulus to an outer annulus.

7. In a torsion dynamometer for power transmission mechanism, the combination with two elements of the transmission mechanism, of resilient connecting means interconnecting them so that the torque to be measured is transmitted through such resilient means, such resilient means comprising an inner annulus connected to one of said transmission members, an outer annulus concentric with the inner annulus and connected to the other transmission member, and a plurality of resilient spokes formed integral with both said annuli to avoid backlash and shaped so as to be comparatively flexible as regards relative angular movement about the axis and comparatively stiff as regards relative axial movement between the annuli, and means for measuring relative angular movement between the annuli about the axis.

8. In a torsion dynamometer for power transmission mechanism, the combination with two elements of the transmission mechanism, of resilient connecting means interconnecting them so that the torque to be measured is transmitted through such resilient means, such resilient means comprising an inner annulus connected to one of said transmission members, an outer annulus concentric with the inner annulus and connected to the other transmission member, and a plurality of resilient spokes formed integral with both said annuli to avoid backlash, tapering from both ends towards an intermediate point and shaped so as to be comparatively flexible as regards relative angular movement about the axis and comparatively stiff as regards relative axial movement between the annuli, and means for measuring relative angular movement between the annuli about the axis.

9. In a torsion dynamometer for power transmission mechanism, the combination with two transmission elements of the transmission mechanism, of two resilient members which are connected between the transmission members so that the torque to be measured is transmitted through said resilient members in series and of which one comprises inner and outer coaxial annuli, and a plurality of resilient spokes formed integral with both said annuli to avoid backlash and shaped so as to be comparatively flexible as regards relative angular movement about an axis and comparatively stiff as regards relative axial movement between the annuli, means for measuring the relative angular movement between the annuli, and damping means connected across the other resilient member.

10. In a torsion dynamometer for power transmission mechanism, the combination with two transmission elements of the transmission mechanism, of two resilient members which are connected between the transmission members so that the torque to be measured is transmitted through said resilient members in series and of which one comprises inner and outer coaxial annuli, and a plurality of resilient spokes formed integral with both said annuli to avoid backlash, tapering from both ends towards an intermediate point and shaped so as to be comparatively flexible as regards relative angular movement about the axis and comparatively stiff as regards relative axial movement between the annuli, means for measuring the relative angular movement between the annuli, and damping means connected across the other resilient member.

11. In a torsion dynamometer for power transmission mechanism, the combination with two transmission elements of the transmission mechanism, of two resilient members which are connected between the transmission members so that the torque to be measured is transmitted through said resilient members in series and of which one comprises inner and outer coaxial annuli, and a plurality of resilient spokes formed integral with both said annuli to avoid backlash and shaped so as to be comparatively flexible as regards relative angular movement about the axis and comparatively stiff as regards relative axial movement between the annuli, whilst the other comprises resilient radial arms interleaved between those of the first resilient member, damping means connected across one of such resilient members, and measuring means connected across the other for measuring the deflection thereof.

12. In a torsion dynamometer for power transmission mechanism, the combination with two transmission elements of the transmission mechanism, of two resilient members which are connected between the transmission members so that the torque to be measured is transmitted through said resilient members in series and of which one comprises inner and outer coaxial annuli, and a plurality of resilient spokes formed integral with both said annuli to avoid backlash and shaped so as to be comparatively flexible as regards relative angular movement about the axis and comparatively stiff as regards relative axial movement between the annuli, whilst the other comprises resilient radial arms interleaved between those of the first resilient member and connected at their outer ends to the outer annulus by connections permitting relative axial movement, damping means connected across the latter of such resilient members, and measuring means connected across the former for measuring the deflection thereof.

NEIL SHAW MUIR.